US008481199B2

(12) United States Patent
Zama et al.

(10) Patent No.: US 8,481,199 B2
(45) Date of Patent: Jul. 9, 2013

(54) SEALED BATTERY WITH A FILM CASING

(75) Inventors: Koichi Zama, Sendai (JP); Isao Tochihara, Sendai (JP)

(73) Assignee: NEC Energy Devices, Ltd., Sagamihara-shi (JP)

( * ) Notice: Subject to any disclaimer, the term of this patent is extended or adjusted under 35 U.S.C. 154(b) by 1426 days.

(21) Appl. No.: 11/812,121

(22) Filed: Jun. 15, 2007

(65) Prior Publication Data
US 2007/0292753 A1 Dec. 20, 2007

(30) Foreign Application Priority Data

Jun. 16, 2006 (JP) .................................. 2006-167372

(51) Int. Cl.
*H01M 2/02* (2006.01)
(52) U.S. Cl.
USPC ............................. 429/175; 429/185; 429/181
(58) Field of Classification Search
USPC .................................... 429/178, 179, 181, 185
See application file for complete search history.

(56) References Cited

U.S. PATENT DOCUMENTS

| | | | |
|---|---|---|---|
| 6,531,246 B2 * | 3/2003 | Hanafusa et al. ............. | 429/162 |
| 6,623,885 B1 * | 9/2003 | Watanabe et al. ............ | 429/178 |
| 2004/0001999 A1 * | 1/2004 | Oogami ........................ | 429/162 |
| 2004/0002000 A1 * | 1/2004 | Oogami et al. ............... | 429/162 |
| 2004/0029001 A1 * | 2/2004 | Yamazaki et al. ............ | 429/176 |
| 2004/0038126 A1 * | 2/2004 | Gu ................................ | 429/162 |

FOREIGN PATENT DOCUMENTS

| | | |
|---|---|---|
| EP | 0 570 590 A1 | 11/1993 |
| EP | 1 096 589 A1 | 5/2001 |
| JP | 2000-173576 A | 6/2000 |
| JP | 2002-056839 A | 2/2002 |
| WO | WO 2004/114452 A1 | 12/2004 |

OTHER PUBLICATIONS

European Search Report dated Nov. 7, 2007, issued in corresponding European patent application No. 07 110351.
Japanese Notice of Rejection dated Sep. 12, 2011 from corresponding JP Appl. No. 2006-167372.

* cited by examiner

*Primary Examiner* — Raymond Alejandro
(74) *Attorney, Agent, or Firm* — Westerman, Hattori, Daniels & Adrian, LLP

(57) ABSTRACT

A sealed battery with a film casing, comprising: a film casing covering a battery element; an electrode terminal pulled out by being conductive-connected to a positive electrode and a negative electrode of the battery element is taken out from a sealing part of the film casing; and a part of the electrode terminal between a portion positioned at the sealing part of the electrode terminal and a part of a portion of the electrode terminal extending outward beyond the sealing part being covered by an insulating resin layer, a region with low strength against bending being formed at the insulating resin layer positioned at a part extending outward beyond the sealing part or a part of the electrode terminal positioned at a lower layer of the insulating resin layer positioned at a part extending outward beyond the sealing part.

2 Claims, 7 Drawing Sheets

SEALED BATTERY WITH A FILM CASING

CROSS-REFERENCE TO RELATED APPLICATIONS

This application is based upon and claims the benefit of priority from prior Japanese Patent Application No. 2006-167372, filed Jun. 16, 2006, the entire contents of which are incorporated herein by reference.

BACKGROUND OF THE INVENTION

1. Field of the Invention

The present invention relates to a battery with a film casing and a method of manufacturing the same, and more particularly, to a sealed battery with a film casing having a reliable terminal structure.

2. Description of the Related Art

In recent years, to meet a demand of a battery having higher capacity and smaller size, a lithium ion battery has been used as a power source of mobile equipment such as a mobile phone and a digital still camera. In addition, the lithium ion battery which has a high energy density and does not have a memory effect is also used as a power source for an electric bicycle, an electric tool, or an electric car. Smaller size is required in the mobile equipment and power source, and in accordance therewith, the lithium ion battery has required to be designed smaller and thinner in shape.

A battery, in which a plurality of positive electrodes and negative electrodes having a flat-plate shape are stacked via a separator, a power collection tab connected to each of the electrodes is connected in parallel to one another, and the electrodes are covered by a flexible film casing such as a laminated film obtained by laminating a metal film such as an aluminum foil and a synthetic resin film, has been used. Such a film casing is characterized in that water and gas do not pass through, and that a sealing characteristic by heat welding is excellent.

FIG. 7 is a plan view explaining a conventional battery with a film casing.

A battery 1 with a film casing has a battery element 2 covered by a film casing 3 obtained by laminating an aluminum foil and a synthetic resin film. In addition, an electrode terminal 4A on a positive electrode side and an electrode terminal 4B on a negative electrode side bonded with the battery element 2 are sealed at a sealing part 5 of the film casing 3.

In addition, a periphery of a part positioned at the sealing part 5 of the electrode terminals 4A and 4B is covered by an insulating resin layer 6 extending beyond the sealing part 5, and the insulating resin layer 6 is sealed and integrated with the film casing 3 at the sealing part 5 by a method such as heat welding. As a result, there is no possibility that the metal layer such as an aluminum foil configuring the film casing and the electrode terminal contact with each other, and a short circuit due to the aluminum foil which is a component member of the film casing can be prevented.

In addition, JP-A-2000-21387 proposes the prevention of a short circuit of a positive electrode terminal and a negative electrode terminal by exposing an adhesive layer positioned at an inner surface side of the battery on the film casing more outwardly than a metallic foil.

When the positive and negative electrode terminals of the battery with a film casing is connected to a circuit substrate and a protective element, or when a plurality of batteries are connected in series or in parallel to manufacture a battery module, it is essential that the electrode terminals are bent in order to reduce the size of battery module.

However, when the electrode terminals are bent in the battery shown in FIG. 7, a part covered by the insulating resin layer 6 has strength against bending higher than other parts and the electrode terminals bend at an edge of the insulating resin layer 6. Therefore, it has been difficult to bend the part covered by the insulating resin layer. As a result, the electrode terminals are bent along a bending line 7.

However, when the electrode terminals 4A and 4B are bent at an edge of the insulating resin layer 6, there has been a possibility that the electrode terminals are cut due to lower strength against bending. Therefore, there has been a problem in terms of reliability.

SUMMARY OF THE INVENTION

According to an aspect of the present invention, there is provided a sealed battery with a film casing, comprising: a film casing covering a battery element; an electrode terminal pulled out by being conductive-connected to a positive electrode and a negative electrode of the battery element is taken out from a sealing part of the film casing; and a part of the electrode terminal between a portion positioned at the sealing part of the electrode terminal and a part of a portion of the electrode terminal extending outward beyond the sealing part being covered by an insulating resin layer, a region with low strength against bending being formed at the insulating resin layer positioned at a part extending outward beyond the sealing part or a part of the electrode terminal positioned at a lower layer of the insulating resin layer positioned at a part extending outward beyond the sealing part.

According to an aspect of the present invention, there is provided the sealed battery in which the region with low strength against bending is formed by a notched part or a void part.

According to an aspect of the present invention, there is provided the sealed battery in which the notched part or the void part formed on the electrode terminal has a conductive sectional area which is fused by an excess current.

According to an aspect of the present invention, there is provided the sealed battery in which the notched part or the void part provided on the insulating resin layer is provided on both sides of the insulating resin layer in a width direction or in a groove in the width direction.

According to an aspect of the present invention, there is provided the sealed battery in which the battery element is a stacked type where a positive electrode and a negative electrode facing each other via a separator are stacked, or a jelly roll type where the positive electrode and the negative electrode facing each other via the separator are rolled.

In addition, according to the present invention, when the positive and the negative electrode terminals of the battery with the film casing are connected to a protective element, or when the electrode terminals are connected with each other in series or in parallel, the electrode terminals can be easily bent. Further, downsizing of a battery module can be achieved while reliability of a pulled-out terminal part after the bending is ensured. In addition, a function of a current fuse can be added by adjusting the size of the notched part provided on the electrode terminal, therefore a battery with higher safety can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, the present invention will be described with reference to the accompanying drawings.

Figure 1A:
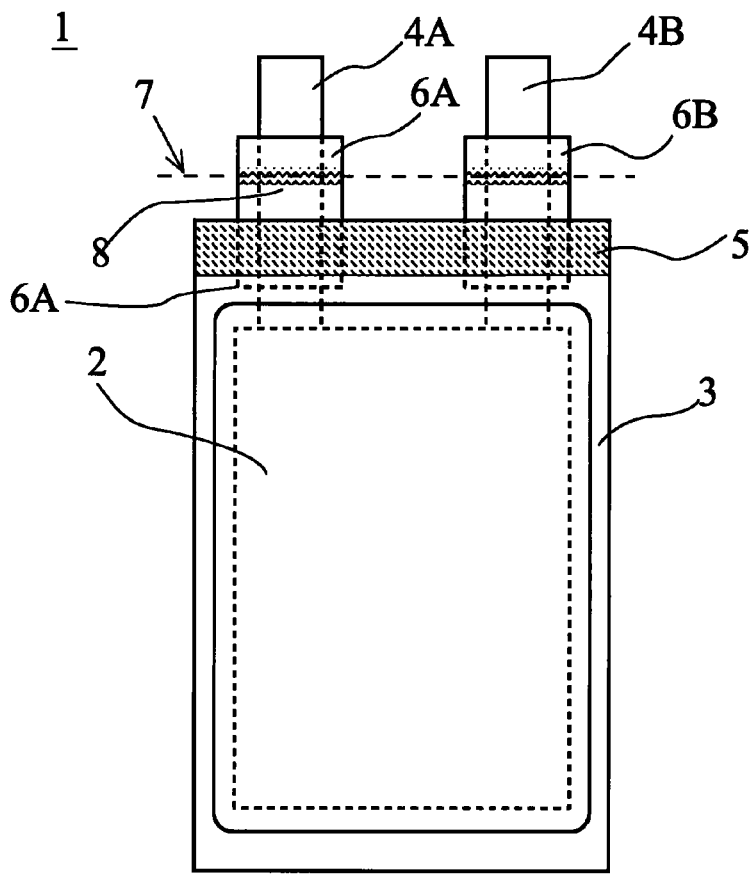
FIG. 1A is a plan view explaining a battery with a film casing according to an embodiment of the present invention.
Figure 1B:
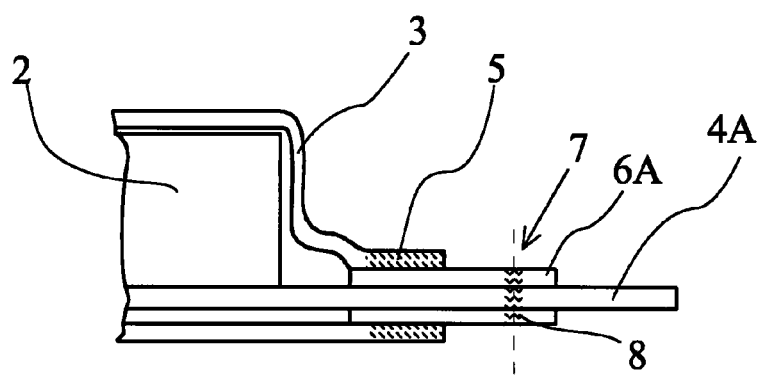
FIG. 1B is a cross-sectional view explaining a part in the vicinity of a sealing part of the battery shown in FIG. 1A.

FIG. 1A is a plan view explaining a battery with a film casing according to an embodiment of the present invention. In addition, FIG. 1B is a cross-sectional view explaining a part in the vicinity of a sealing part.

A battery 1 with a film casing has a battery element 2 covered by a film casing 3 obtained by laminating an aluminum foil and a synthetic resin film.

An electrode terminal 4A on a positive electrode side and an electrode terminal 4B on a negative electrode side connected to the battery element 2 are sealed at a sealing part 5 of the film casing 3.

In addition, a periphery of a part positioned at the sealing part 5 of the electrode terminal 4A on the positive electrode side and the electrode terminal 4B on the negative electrode side is covered by insulating resin layers 6A and 6B extending beyond the sealing part 5. The insulating resin layers 6A and 6B are sealed and integrated with the film casing 3 at the sealing part 5 by a method such as heat welding.

Since the sealing part 5 and an exterior thereof are covered by the insulating resin layers 6A and 6B, there is no possibility that a metal layer such as an aluminum foil configuring the film casing contacts with the electrode terminal 4A or 4B, and a short circuit due to the aluminum foil which is a component member of the film casing can be prevented.

In addition, an easy bending part 8 at which the insulating resin layer 6 can be easily bent as compared with other parts is formed at a bending line 7 on the insulating resin layers 6A and 6B. For this reason, when the electrode terminal is bent, the electrode terminals 4A and 4B can be bent along the bending line 7 together with the insulating resin layer 6. Therefore, a problem in which the electrode terminals 4A and 4B are cut at an edge part or the like can be resolved.

In addition, an edge part 6A inside of the insulating resin layer 6 is preferably extended beyond an edge part inside of the sealing part 5 as illustrated in the figure. However, even if the edge part 6A is not extended to the edge part inside of the sealing part 5, a bending characteristic and reliability of the electrode terminal can be ensured.

In addition, the electrode terminals 4A and 4B are covered by the insulating resin layers 6A and 6B in advance, and then the insulating resin layers 6A and 6B can be mounted on- and sealed with the film casing 3. In addition, after an insulating resin film is allocated on the film casing 3, the electrode terminal may be mounted and then sealed and integrated.

The sealing part can be formed by heat welding of a polyethylene film and so on which have an excellent heat-welding property formed on an inner surface of the film casing. In addition, processing for easy adhesiveness may be carried out on the sealing part, or a material with easy adhesiveness may be allocated.

Alternatively, a material having adhesiveness can be allocated to form the sealing part without heat welding.

Figure 2:
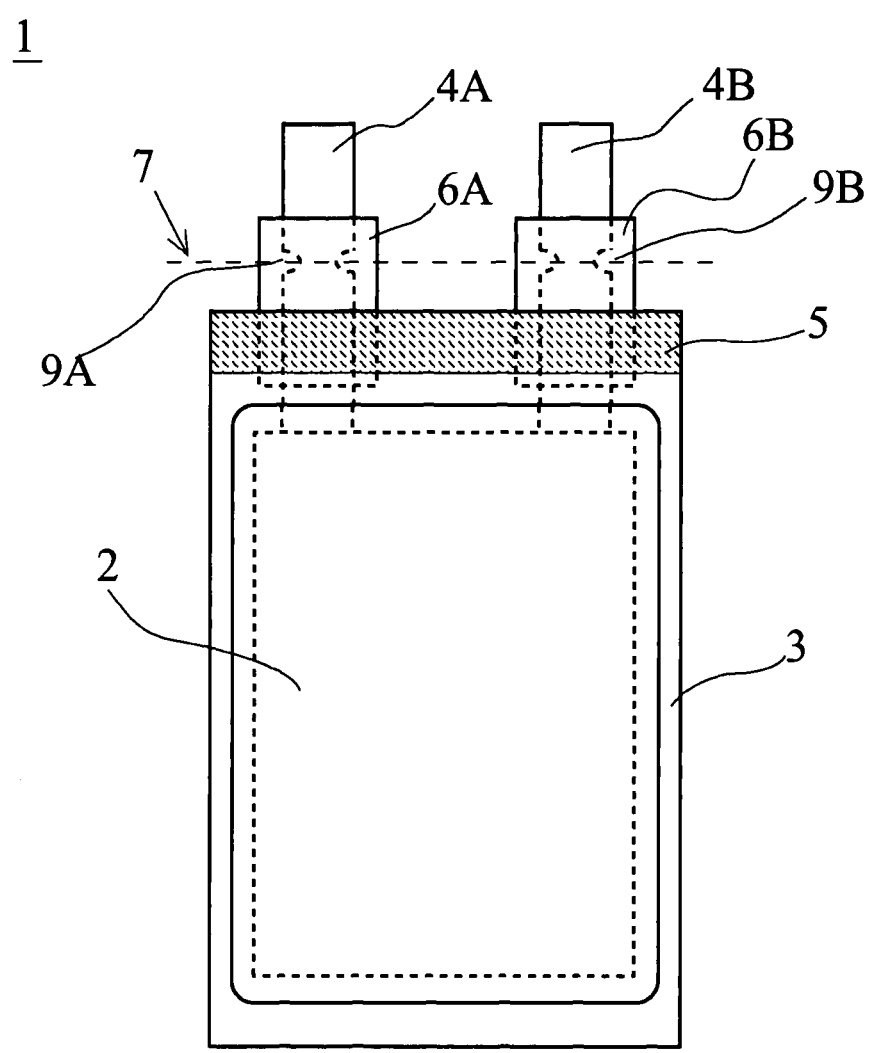
FIG. 2 is a view explaining the battery with a film casing according to another embodiment of the present invention.

FIG. 2 is a view explaining another embodiment.

In the battery with the film casing shown in FIG. 2, each of the electrode terminals 4A and 4B is provided with notch parts 9A and 9B.

As a result, along the bending line 7 passing through a projected part of notch parts 9A and 9B, the electrode terminal can be easily bent together with the insulating resin layers 6A and 6B.

In addition, by adjusting size of a conductive sectional area of the electrode terminal remaining after forming the notch parts 9A and 9B, a fuse function can be added for cutting an electric current by cutting the conductive sectional area in a case that an abnormally excessive current flows.

Figure 3:
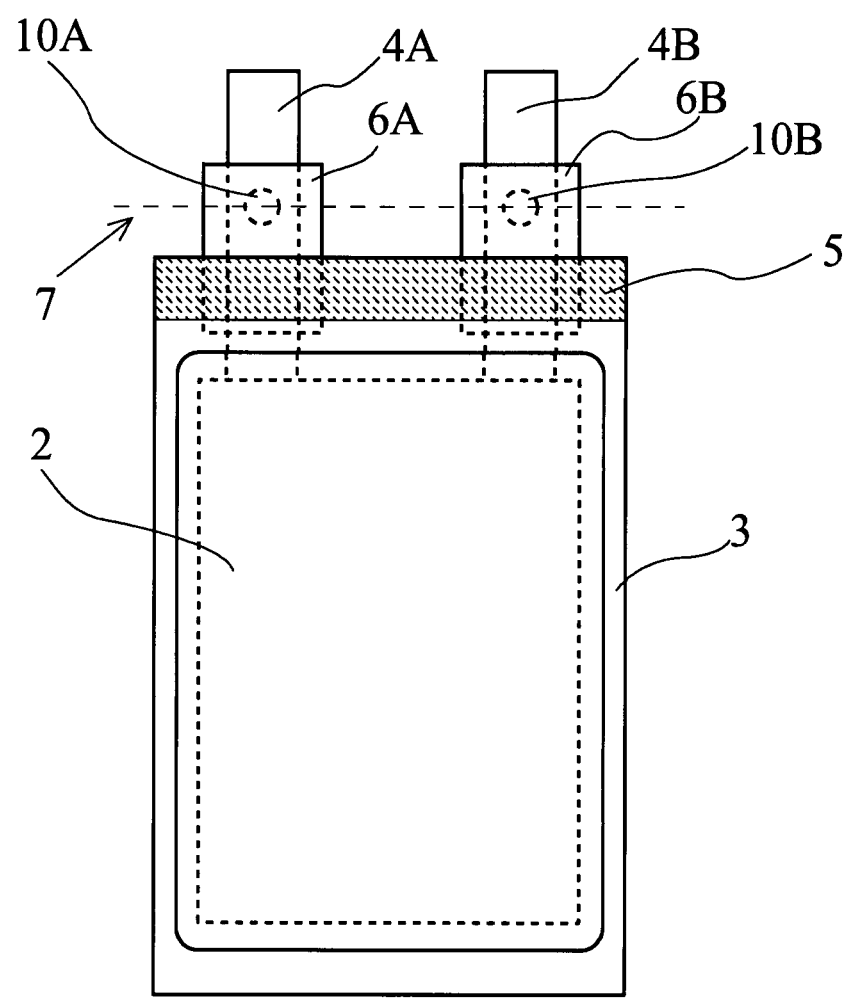
FIG. 3 is a view explaining the battery with a film casing according to another embodiment of the present invention.

FIG. 3 is a view explaining another embodiment.

FIG. 3 shows an example where void parts 10A and 10B are formed by forming a circular through hole on the electrode terminals 4A and 4B. The electrode terminal can be easily bent together with the insulating resin 6 along the bending line 7 passing through a projected part of the void parts.

In the present invention, a similar effect can be achieved by providing a notch part or a void part of an optional shape as described above.

Figure 4:
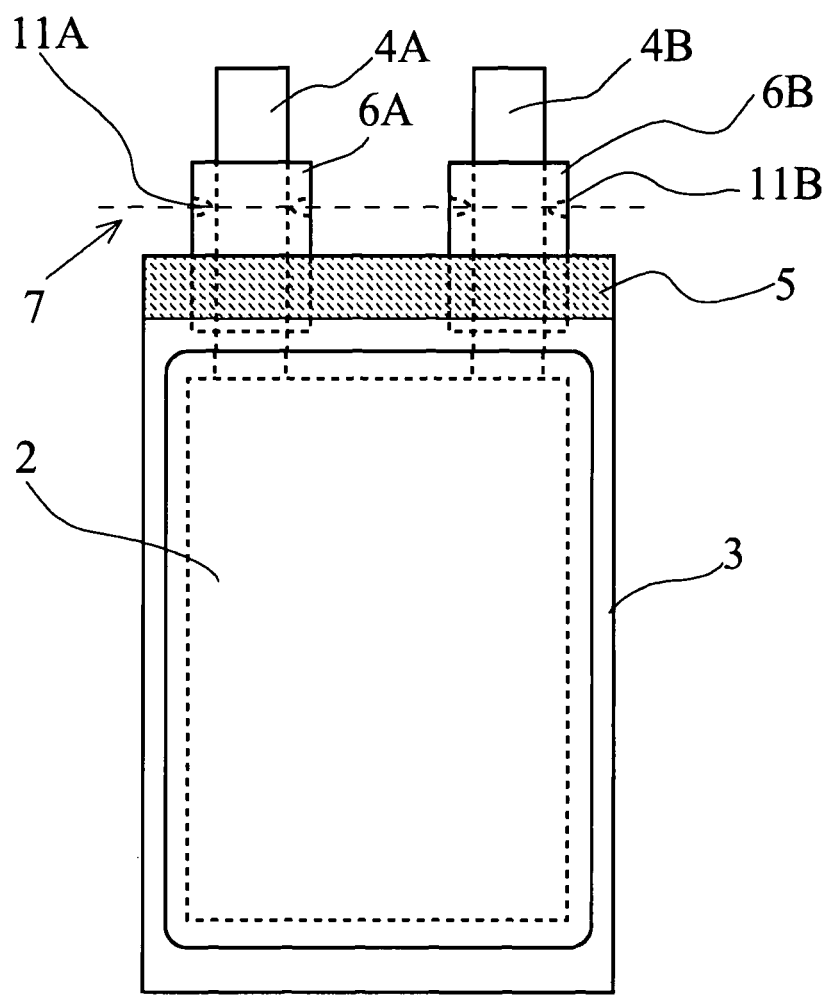
FIG. 4 is a view explaining the battery with a film casing according to another embodiment of the present invention.

FIG. 4 is a view explaining another embodiment.

In FIG. 4, processing is not applied to the electrode terminals 4A and 4B, and notch parts 11A and 11B are provided on an edge part of the insulating resin 6A and 6B covering the electrode terminals 4A and 4B in a width direction. In the battery in the present embodiment as well, the battery having a characteristic similar to a case where the notch part or the void part is provided on the electrode terminal can be obtained.

Figure 5A:
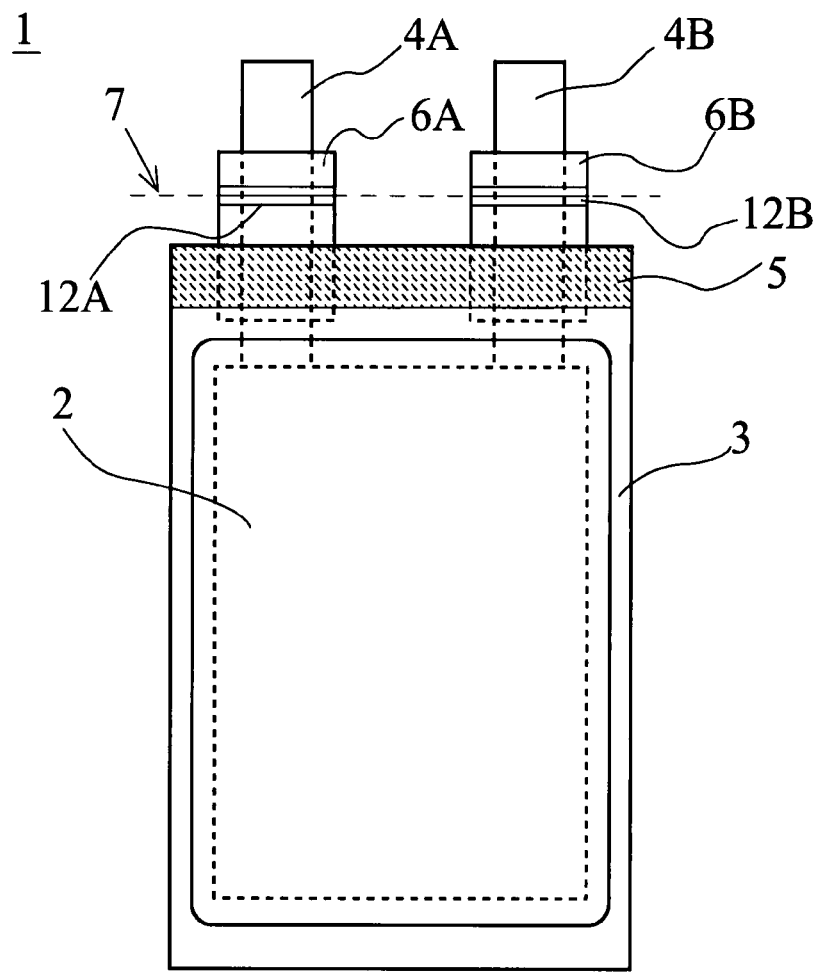
FIG. 5 is a view explaining the battery with a film casing according to another embodiment of the present invention.
Figure 5B:
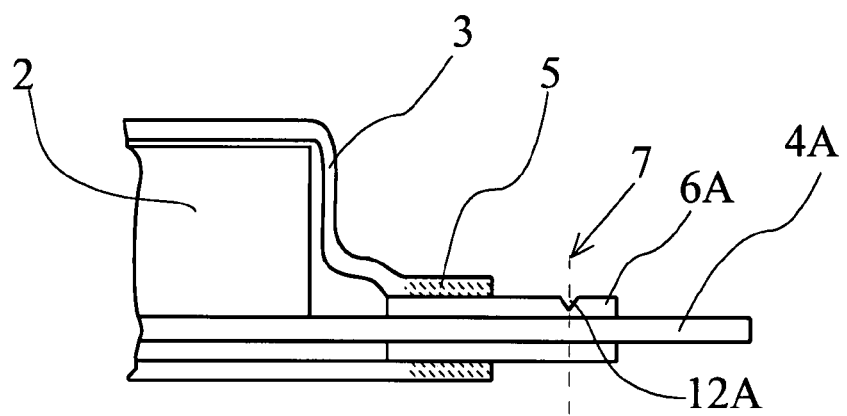

FIG. 5 is a view explaining another embodiment.

In FIG. 5, processing is not applied to the electrode terminals 4A and 4B, and groove-shaped notch parts 12A and 12B extending in a width direction are provided on the insulating resins 6A and 6B covering the electrode terminals 4A and 4B. In the battery in the present embodiment as well, the battery having a characteristic similar to the battery shown in FIG. 4 can be obtained.

Figure 6:
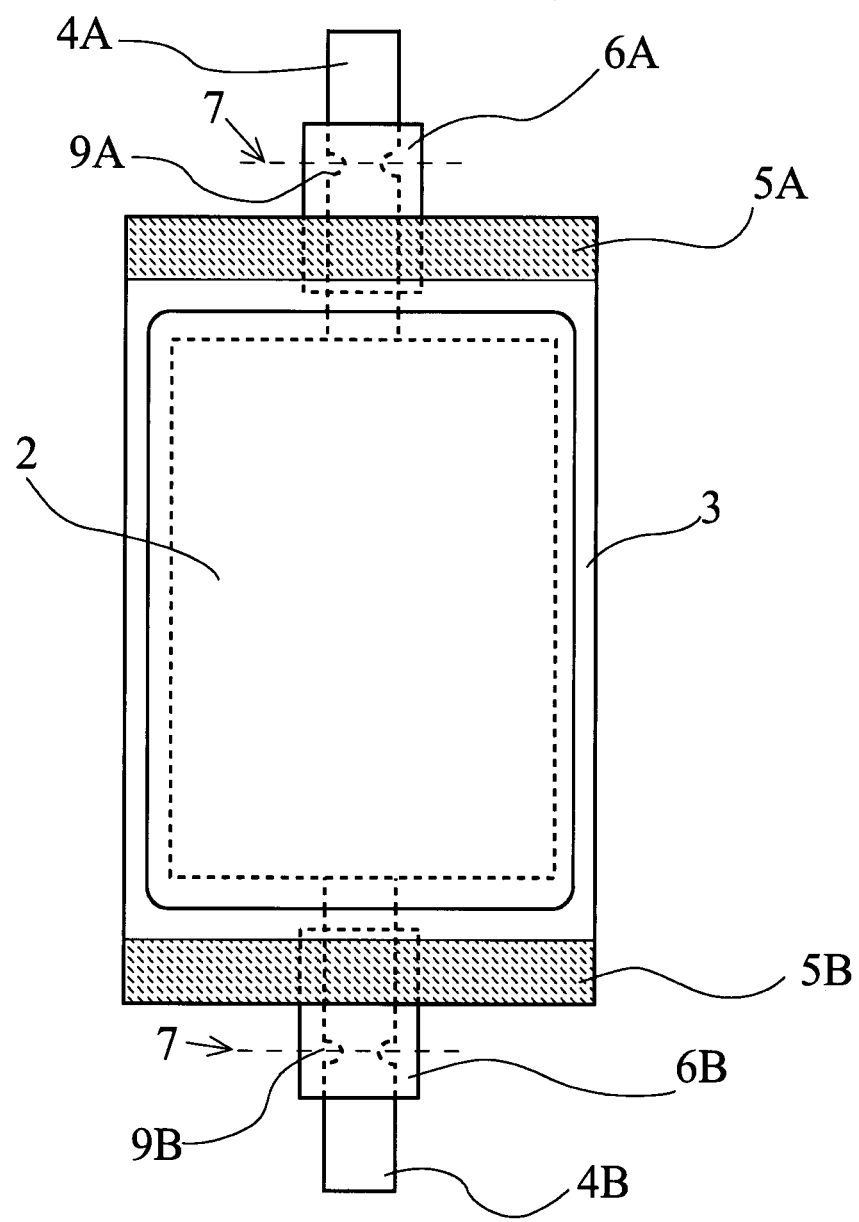
FIG. 6 is a view explaining the battery with a film casing according to another embodiment of the present invention.
Figure 7:
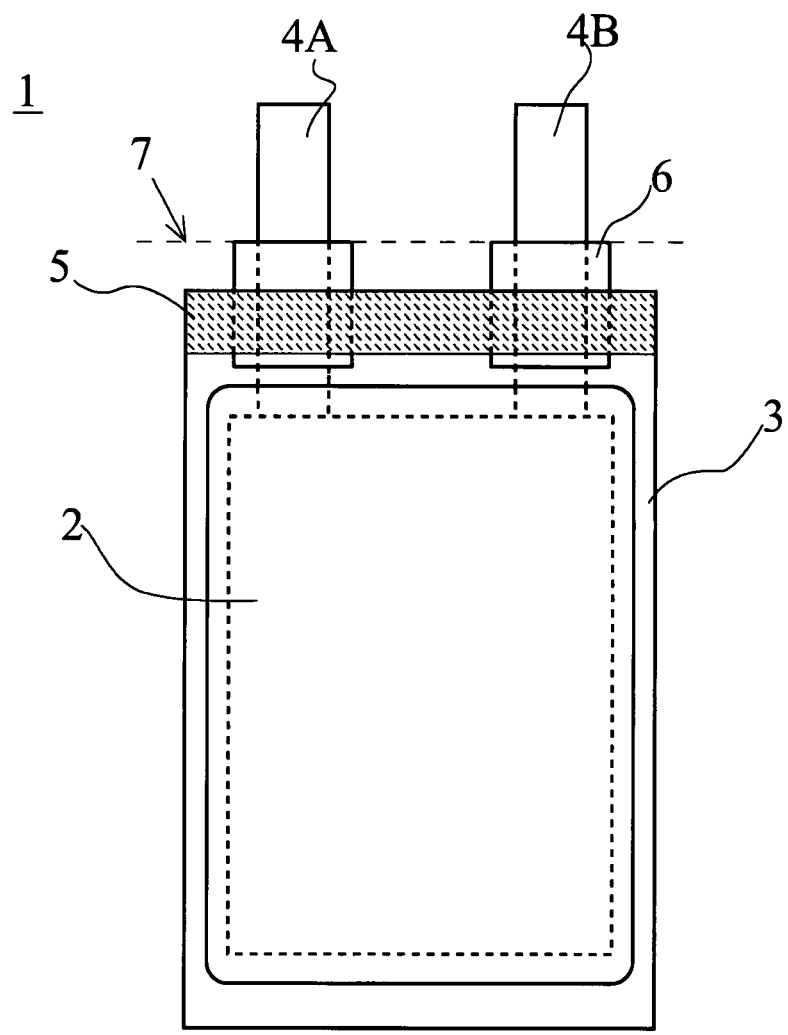
FIG. 7 is a view explaining a conventional battery with a film casing.

FIG. 6 is a view explaining another embodiment.

The battery shown in FIGS. 1 to 5 has the positive electrode terminal and the negative electrode terminal being taken out from the same side. On the contrary, the battery 1 shown in FIG. 6 has the electrode terminal 4A on the positive electrode side and the electrode terminal 4B on the negative electrode side being taken out from the sealing parts 5A and 5B provided on opposite sides.

Then, the notch parts 9A and 9B are formed on the electrode terminals 4A and 4B, respectively, and the electrode terminals can be easily bent together with the insulating resin layers 6A and 6B along the bending line 7 passing through projection parts of the notch parts.

The present embodiment can be used in a case where each of the electrode terminals having different polarity is preferably taken out in opposite directions from different sides of the battery.

Next, a manufacturing method of the battery with the film casing according to embodiments of the present invention will be described.

First, the positive electrode in which a positive power collection tab is pulled out is formed by applying a positive active material such as lithium manganese complex oxide ($LiMn_2O_4$) which occludes and releases lithium ion except on the positive power collection tab pulled out from the positive power collection body on the positive power collection body including an aluminum foil.

In addition, the negative electrode in which a negative power collection tab is pulled out is formed by applying a negative active material such as graphite which occludes and releases lithium ion except on the negative power collection tab pulled out from the negative power collection body on the negative power collection body including a copper foil.

The positive and negative power collection tabs respectively connect to the positive electrode or the negative electrode, and also connect to the positive and negative electrodes which are outside the electrode terminals. Thickness of the positive and negative power collection tabs only needs to be the same as that of the power collection body when the positive or negative power collection body is used. In addition, width of the power collection tabs may be set in accordance with current capacity to be used.

After the positive electrode and the negative electrode are formed in the manner described above, the positive electrode where the positive power collection tab is pulled out and the negative electrode where the negative power collection tab is pulled out are arranged with a porous film separator of polypropylene, three-layer structure of polypropylene/polyethylene/polypropylene, or the like interposed therebetween to manufacture a stack of the battery element.

In addition, the battery element is not limited to the stack of the positive electrode and the negative electrode. The battery element can be any of a roll type obtained by rolling band-shaped positive electrode and negative electrode arranged via the separator, that is, a jelly roll type. The type of the battery element can be selected depending on size of the battery, and so on.

The positive power collection tab and the negative power collection tab mounted on the battery element are connected to the electrode terminal on the positive electrode side and the electrode terminal on the negative electrode side, respectively, by means of ultrasonic welding, resistance welding and so on.

Next, the battery element connected to the electrode terminal is cased by using the film casing obtained by laminating a synthetic resin film on both surfaces of a metal thin film such as an aluminum foil.

There is a thermoplastic resin layer which is heat-sealed well or has an excellent bonding property by adhesive, such as polyethylene, polypropylene, ionomer, ethylene-methacrylate copolymer, and ethylene-(metha) crylate copolymer on an inner surface side of the battery as the film casing. There is an aluminum foil as a barrier layer. A lamination of polyester resin such as polyethylene terephthalate or nylon resin is used on an outside of the battery.

In addition, after molding such as embossing is carried out so as to match with a shape of the battery element in advance to manufacture a housing of the film casing, the battery element in which the insulating resin layer is formed on the electrode terminal is contained and each side is heat-sealed. Before the last side is sealed, electrolyte solution is poured in and the last side is heat-sealed under reduced pressure, thereby the sealing part can be formed.

In addition, after the insulating resin film is arranged on a predetermined location on the housing of the film casing, each side is heat-sealed after containing the battery element. Before the last side is sealed, electrolyte solution is poured in and the last side is heat-sealed under reduced pressure, thereby the sealing part can be formed.

A material having an excellent affinity with a metal material forming the film casing and the electrode terminal is used for the insulating resin layer to improve sealing performance. For example, polyethylene, polypropylene, ionomer, and so on are considered as such a material.

In addition, forming of the notch part or the void part which is formed on the electrode terminal or the insulating resin layer covering the electrode terminal is carried out as follows:

i. the notch part or the void part is provided on the metal material working as the electrode terminal, and the insulating resin layer is formed on a periphery thereof; or ii. after completing external packaging by using the film casing, processing of the notched part can be carried out before the electrode terminal is bent along the predetermined bending line.

Hereinafter, examples of the present invention will be listed to describe the bending part of the electrode terminal in detail.

EXAMPLE 1

The electrode terminal shown in FIG. 2 was manufactured. The positive electrode terminal 4A had width of 10 mm and thickness of 0.2 mm, and was made of aluminum, and the negative electrode terminal 4B has width of 10 mm and thickness of 0.2 mm, and was made of copper. After the notch part 9 having a semi-ellipse shape with length of 5 mm and breadth of 3 mm was formed on each of the electrode terminals, and each of the electrode terminals was covered by the insulating resin 6 of thickness of 0.1 mm.

In addition, the sealing part 5 formed by the heat welding was provided with width of 9 mm. The insulating resin layer 6 extended from the sealing part with length of 13 mm and width of 17 mm. The notch part 9 was located inside a front edge of the insulating layer for 6 mm.

Due to a structure of the terminal portion, bending along the bending line 7 was facilitated. In addition, the electrode terminals 4A and 4B were bent at a part covered by the insulating resin layer 6, thereby high reliability after the bending is obtained.

EXAMPLE 2

The pulled out portion in the present example is in a shape shown in FIG. 3, where the pulled out portion was manufactured in a similar manner as the example 1 except that the void parts 10A and 10B each of which was one circular through hole was provided in place of two of the notch parts 9A and 9B in a semi-ellipse shape shown in FIG. 2. The diameter of the void parts 10A and 10B was 5 mm, and the center of each of the void parts was allocated at a position 6 mm inside the front edge of the insulating resin layer 6.

In addition, the battery shown in FIG. 3 was manufactured by forming the insulating resin layer after punching a predetermined part of the electrode terminal in advance to form the circular void part. However, the present embodiment may be such that processing of punching in a circular shape is carried out for the electrode terminal covered by the insulating resin layers 6A and 6B after the battery is manufactured to provide the void part on both of the insulating resin layer and the electrode terminal, and thereafter the bending is carried out.

In the example 2 as well, the battery the bending of which is facilitated and having sufficient strength after the bending can be obtained, and the battery similar to the example is obtained.

EXAMPLE 3

The pulled out part in the present example is in a shape shown in FIG. 4, where the notch parts 11A and 11B of a semi-ellipse shape were formed on both sides of the insulating resin layers 6A and 6B in a width direction. The insulating resin layer extending outward from the sealing part had width of 17 mm, height of 24 mm and thickness of 0.1 mm.

In addition, the semi-ellipse of the notch parts 11A and 11B had length of 5 mm and breadth of 3 mm, and was formed on the battery completed by carrying out sealing processing of the battery before the bending processing of the electrode terminal. A terminal structure in which the bending of the electrode terminal is easy and having high reliability of mechanical strength after the bending is obtained.

In addition, according to the example 3, the present invention has a characteristic that adjustment of a position of the notch part at the time of mounting the battery is made possible.

What is claimed is:

1. A sealed battery with a film casing, comprising:
   a film casing covering a battery element;
   an electrode terminal conductive-connected to a positive electrode and a negative electrode of the battery element and extending through a sealing part of the film casing said sealing part being formed by heat sealing;
   a first part of the electrode terminal between a first portion positioned at the sealing part of the electrode terminal and a second part of a portion of the electrode terminal extending outward beyond the sealing part being covered by an insulating resin layer; and an easy bending part having low bending strength as compared with said first part and said second part, a first region with low strength against bending being formed at the insulating resin layer positioned at the second part extending outward beyond the sealing part or a third part of the electrode terminal positioned at a lower layer of the insulating resin layer positioned at the second part extending outward beyond the sealing part; and
   wherein the positive electrode and the negative electrode are individually and separately coated with the insulating resin layer, wherein the first region with low strength against bending is formed by a notched part or a void part, wherein the notched part or the void part provided at the insulating resin layer is provided on both sides of the insulating resin layer in a width direction or in a groove in the width direction, and wherein the battery element is a stacked structure where a positive electrode and a negative electrode facing each other via a separator are stacked, or a jelly roll structure where the positive electrode and the negative electrode facing each other via the separator are rolled.

2. The sealed battery according to claim 1, wherein the notched part or the void part formed on the electrode terminal has a conductive sectional area which is a fuse.

* * * * *